Dec. 3, 1946.   H. G. HOLMES   2,411,879
HEADLIGHT TESTER
Filed June 18, 1940   9 Sheets-Sheet 1
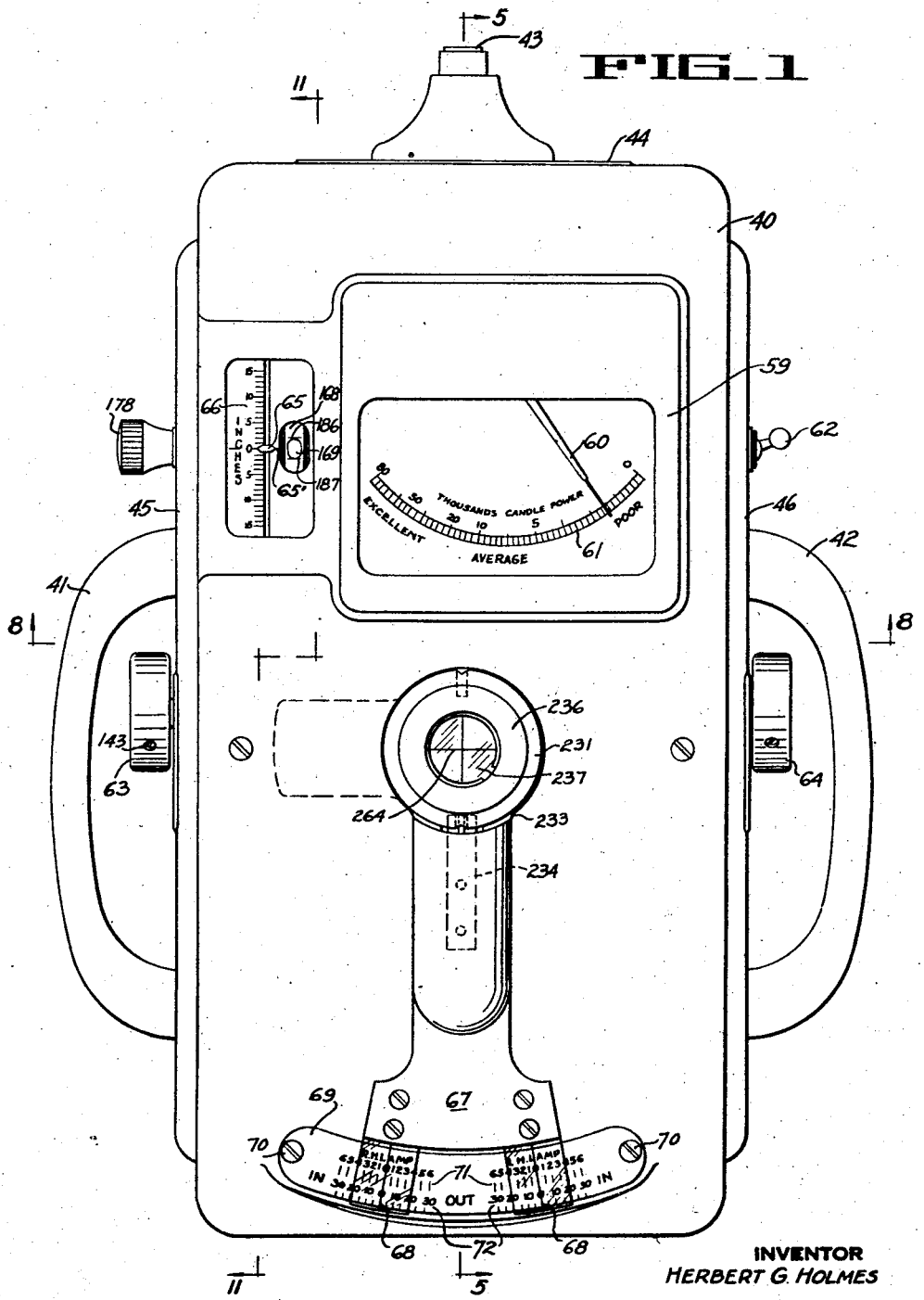
INVENTOR
HERBERT G. HOLMES
BY Philip A. Minnis
ATTORNEY Dec. 3, 1946.  H. G. HOLMES  2,411,879
HEADLIGHT TESTER
Filed June 18, 1940  9 Sheets-Sheet 2
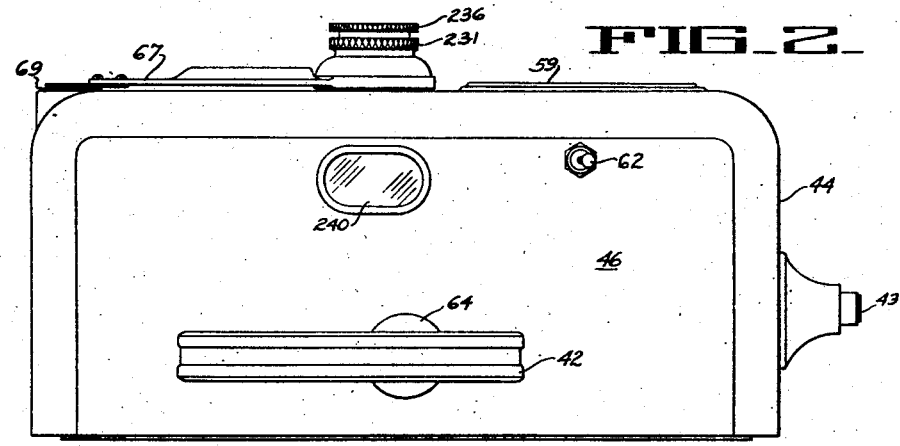
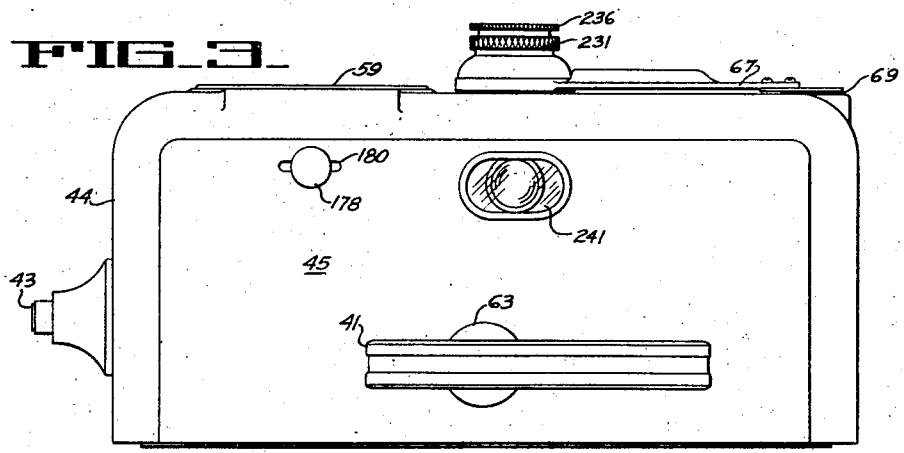
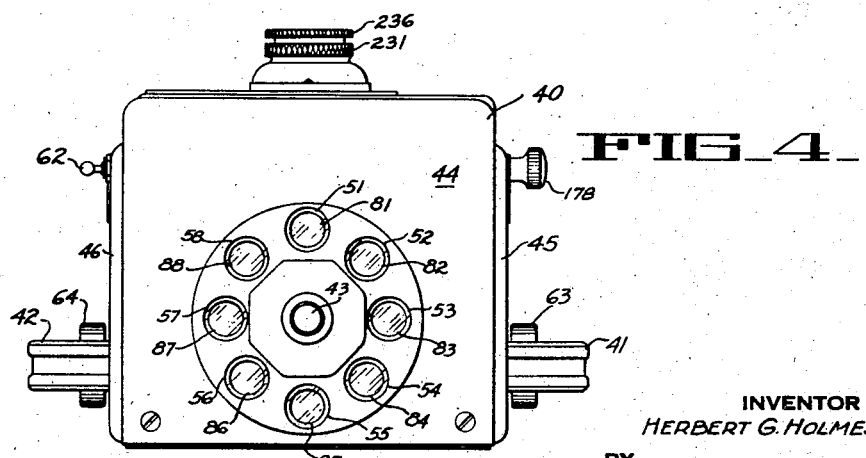
INVENTOR
HERBERT G. HOLMES
BY Philip G. Minnis
ATTORNEY Dec. 3, 1946.   H. G. HOLMES   2,411,879
HEADLIGHT TESTER
Filed June 18, 1940   9 Sheets-Sheet 3
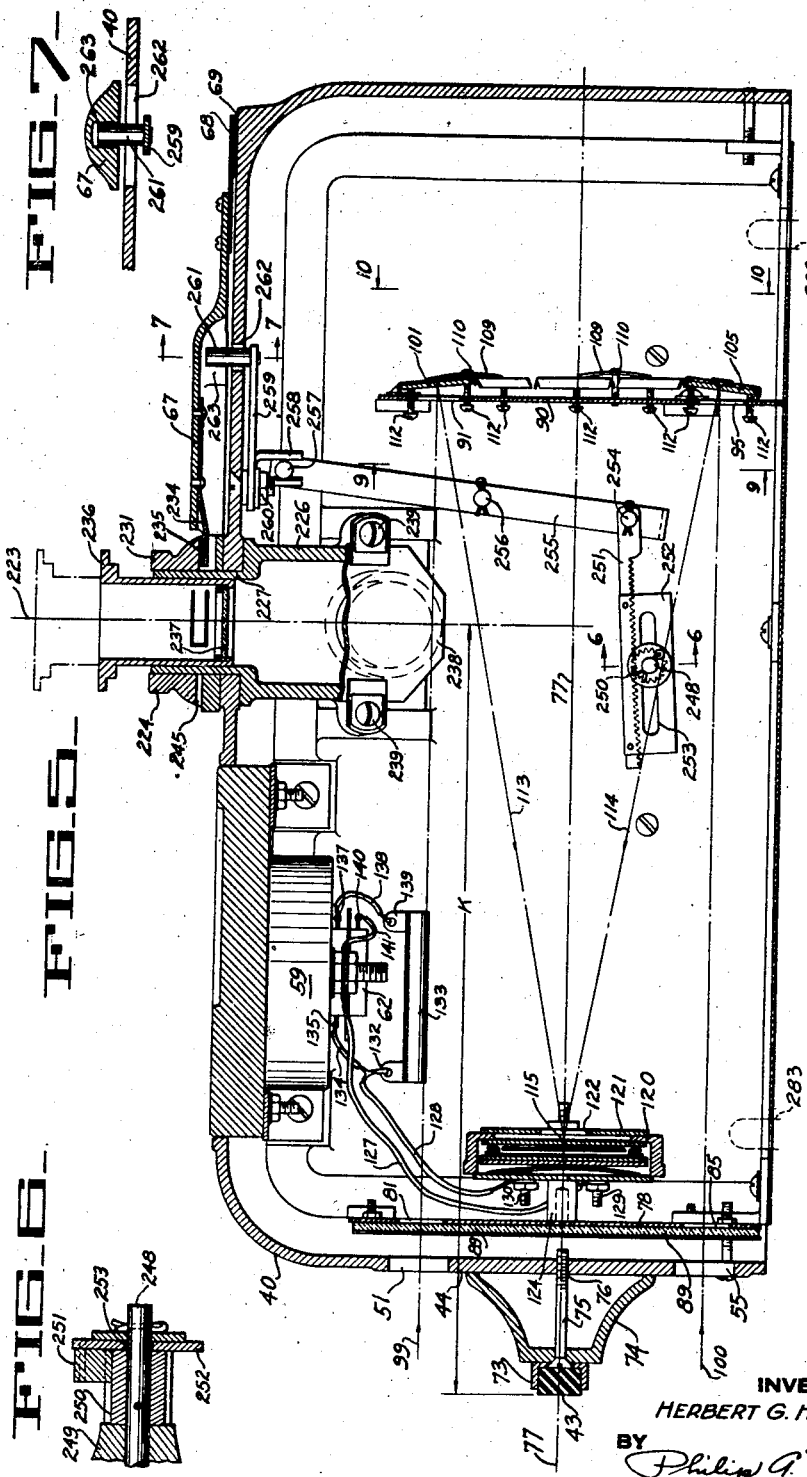
INVENTOR
HERBERT G. HOLMES
BY
Philip G. Minnis
ATTORNEY Dec. 3, 1946.   H. G. HOLMES   2,411,879
HEADLIGHT TESTER
Filed June 18, 1940   9 Sheets-Sheet 4

INVENTOR
HERBERT G. HOLMES
BY
Philip G. Minnis
ATTORNEY

Dec. 3, 1946.   H. G. HOLMES   2,411,879
HEADLIGHT TESTER
Filed June 18, 1940   9 Sheets-Sheet 5
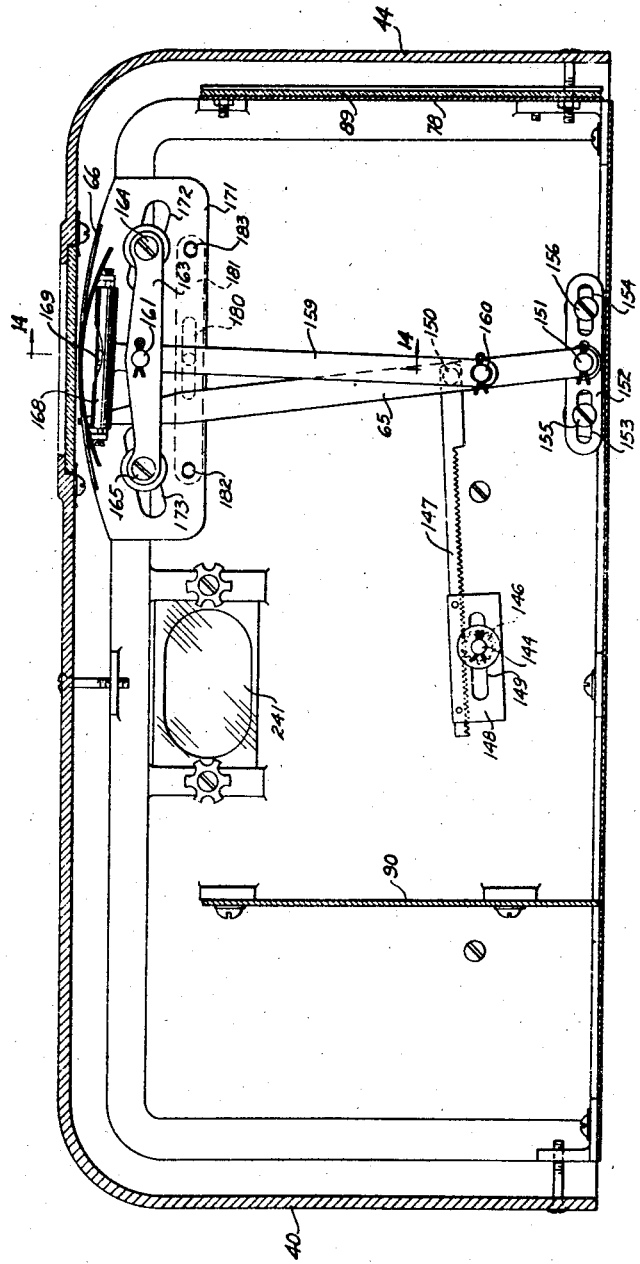
INVENTOR
HERBERT G. HOLMES
BY
Philip G. Minnis
ATTORNEY

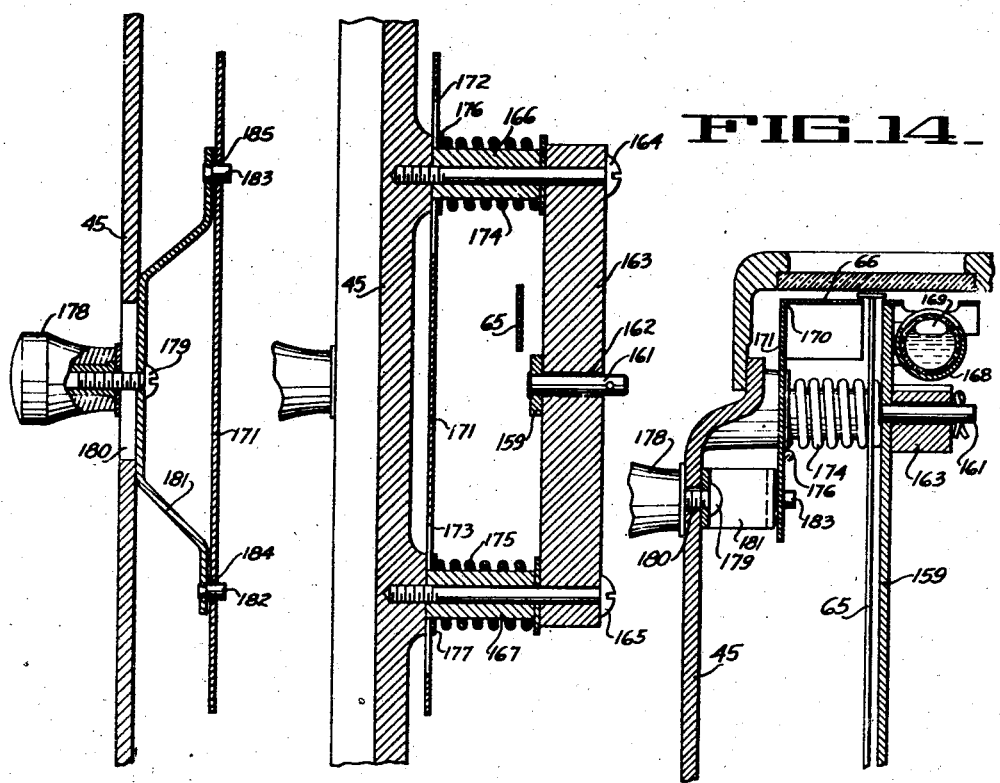
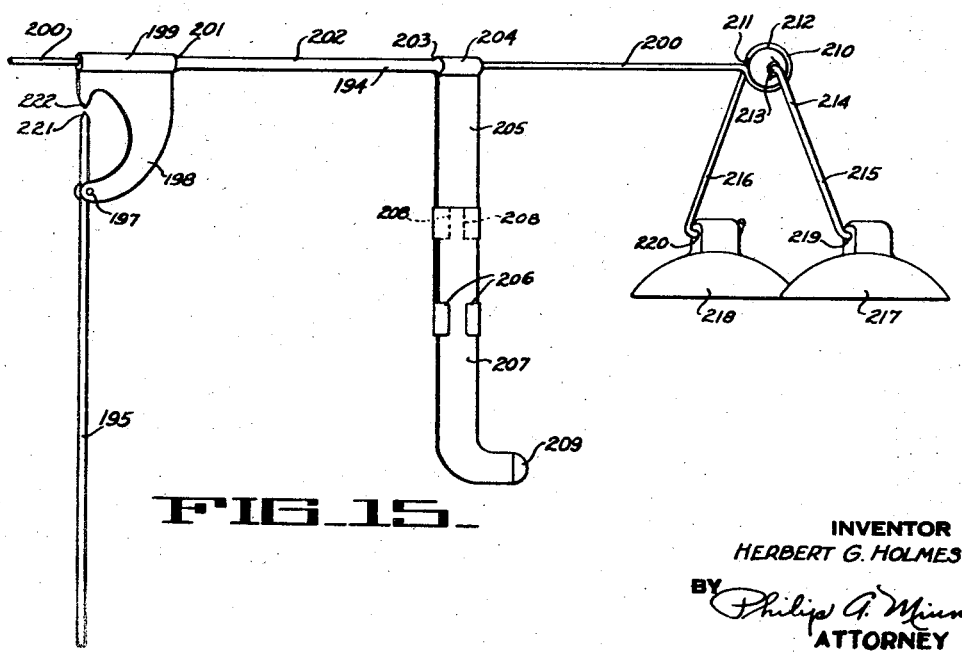

Dec. 3, 1946.  H. G. HOLMES  2,411,879
HEADLIGHT TESTER
Filed June 18, 1940  9 Sheets-Sheet 7
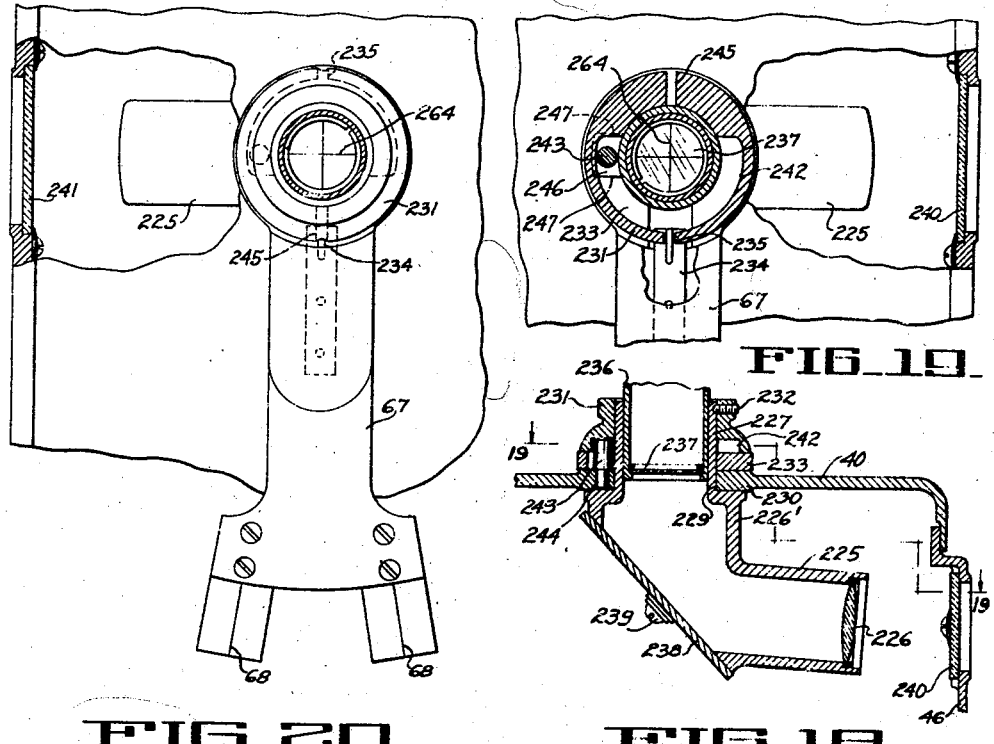
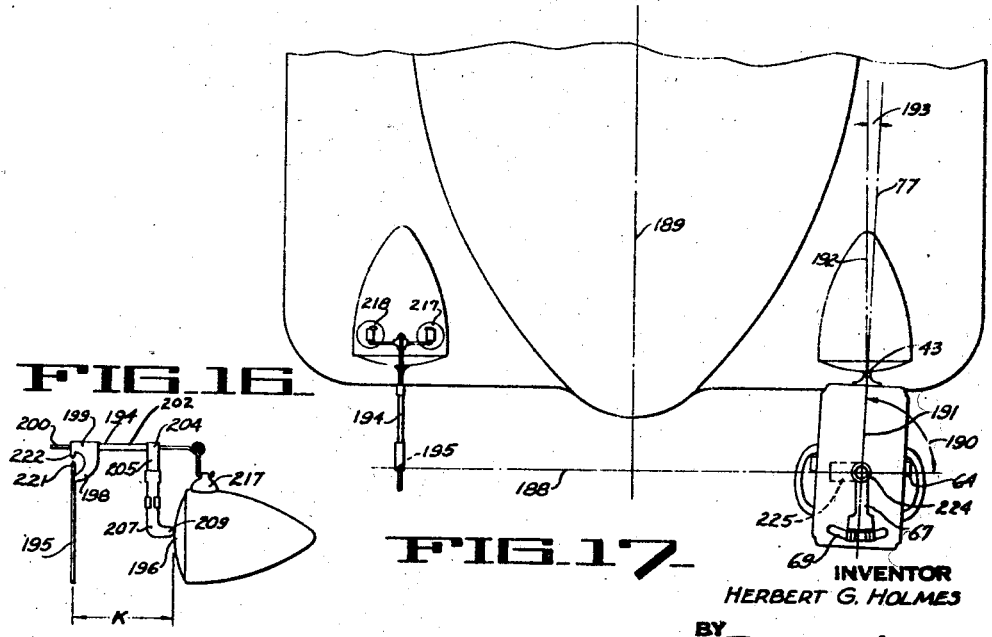
INVENTOR
HERBERT G. HOLMES
BY
*Philip A. Minnis*
ATTORNEY Dec. 3, 1946.  H. G. HOLMES  2,411,879
HEADLIGHT TESTER
Filed June 18, 1940  9 Sheets-Sheet 8
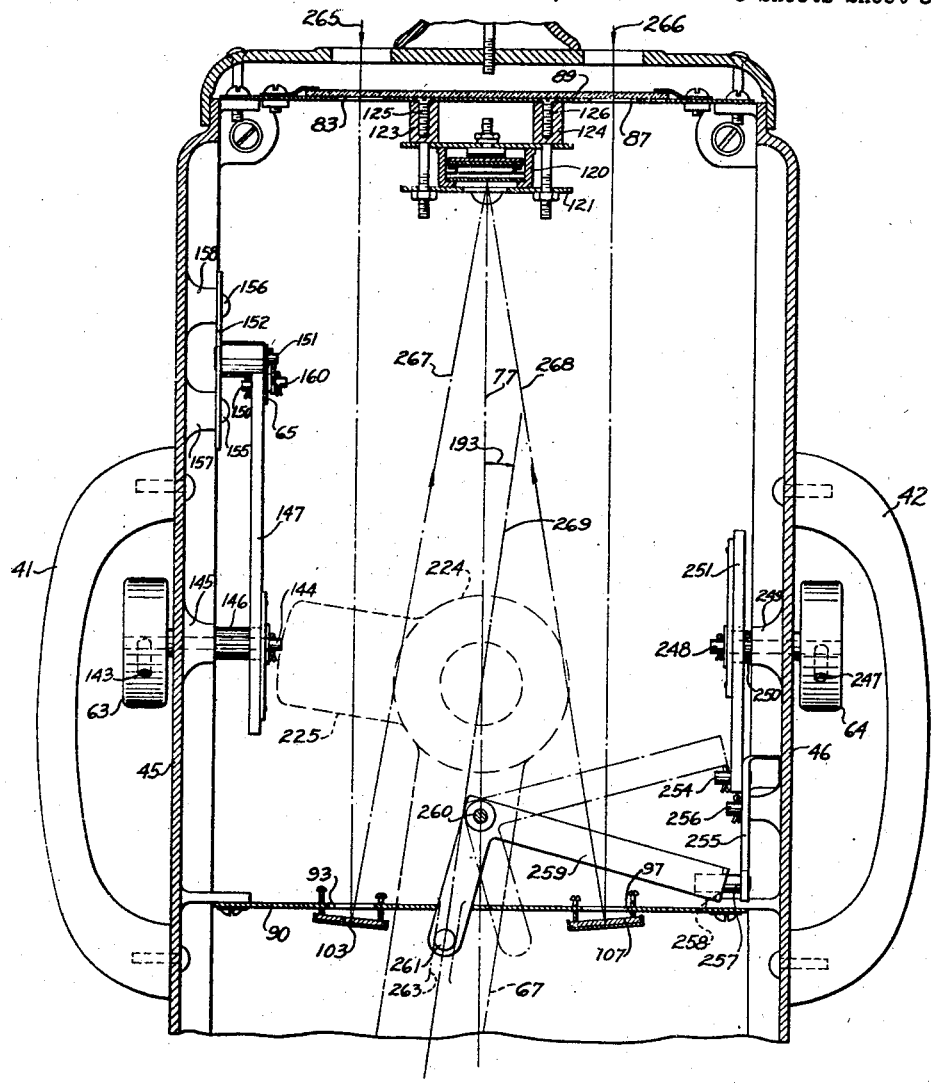
FIG_21_
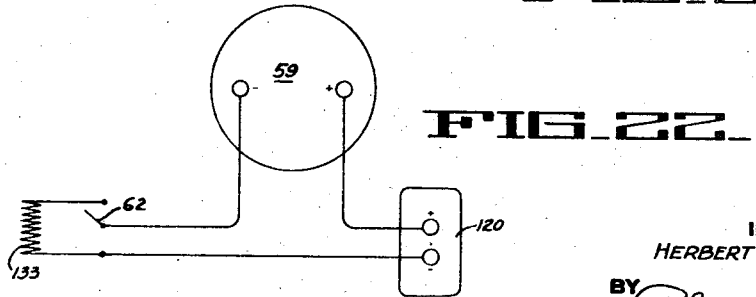
FIG_22_
INVENTOR
HERBERT G. HOLMES
BY Philip G. Minnis
ATTORNEY

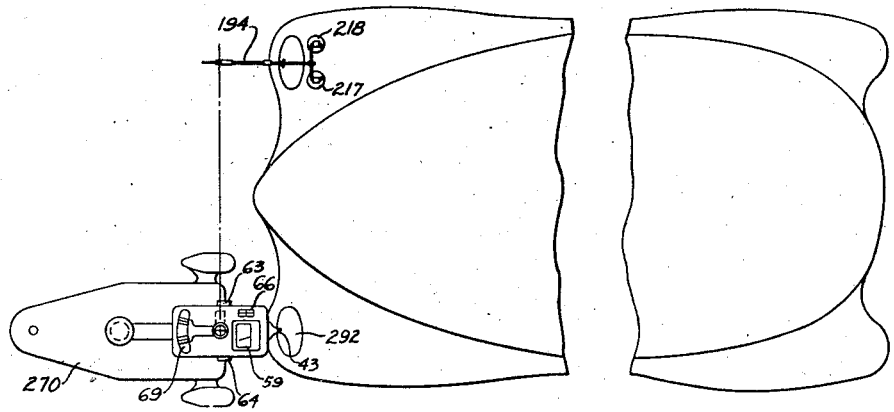
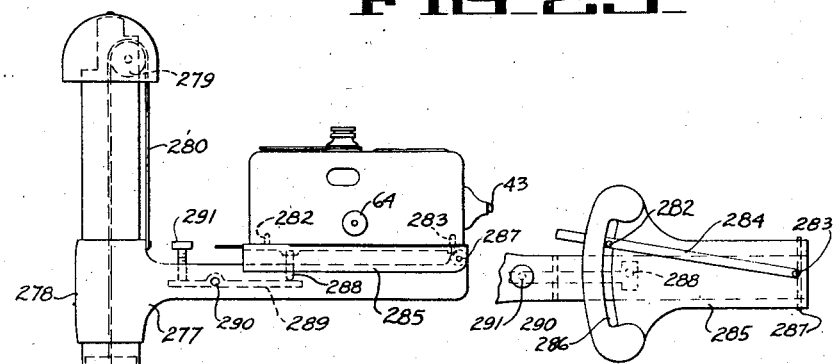
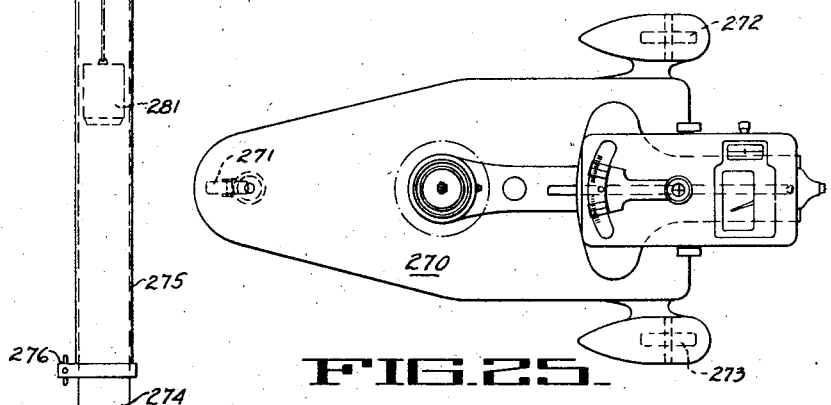
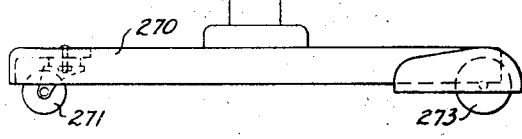

Patented Dec. 3, 1946

2,411,879

UNITED STATES PATENT OFFICE 2,411,879

HEADLIGHT TESTER

Herbert Glenn Holmes, Lansing, Mich., assignor to Food Machinery Corporation, San Jose, Calif., a corporation of Delaware Application June 18, 1940, Serial No. 341,172

31 Claims. (Cl. 88—14)

This invention relates to apparatus for testing the headlights of automobiles and particularly to the type of apparatus employing a light-sensitive cell in the testing instrument.

One of the objects of the invention is to provide a headlight testing instrument adapted to be placed in the beam of a headlight to determine the angular direction of the beam with respect to the line of travel of the vehicle.

Another object of the invention is to provide a headlight testing instrument adapted to be placed in the beam of the headlight to measure the intensity of the beam and to employ the measurement of intensity obtained for determining the angular direction of the beam with respect to the line of travel of the vehicle.

Another object of the invention is to provide a headlight testing instrument adapted to be placed in the beam of the headlight to determine the direction of the beam by measuring the vertical and horizontal inclinations of the beam to the line of travel of the vehicle.

Another object of the invention is to provide an improved means for measuring the vertical inclination of the beam to the line of travel.

Another object of the invention is to provide an apparatus for determining the horizontal inclination of the beam.

Another object of the invention is to provide a means for contacting the lens of the headlight which will serve as a universal pivot on which to adjust the instrument axis in a preliminary step of the testing operation.

Another object of the invention is to provide a headlight testing instrument which can be employed either as a portable hand instrument or in connection with a mobile stand.

Other objects of the invention will appear after a disclosure of an apparatus in which the invention has been embodied.

In the drawings:

Fig. 1 is a plan view of the testing instrument.

Fig. 2 is a right side elevation.

Fig. 3 is a left side elevation.

Fig. 4 is an elevation of the front end of the instrument.

Fig. 5 is a vertical longitudinal section taken as indicated by the arrows 5—5 in Fig. 1.

Fig. 6 is a fragmentary sectional view taken as indicated by the arrows 6—6 in Fig. 5.

Fig. 7 is a fragmentary sectional view taken as indicated by the arrows 7—7 in Fig. 5.

Fig. 11 is a vertical longitudinal section taken as indicated by the arrows 11—11 in Fig. 1.

Fig. 12 is a fragmentary section taken as indicated by the arrows 12—12 in Fig. 8.

Fig. 13 is a fragmentary section taken as indicated by the arrows 13—13 in Fig. 8.

Fig. 14 is a fragmentary section taken as indicated by the arrows 14—14 in Fig. 11.

Fig. 15 is a perspective view of the pendulum rod which is used as a marker.

Fig. 16 illustrates the manner in which the marker is positioned in front of the headlight.

Fig. 17 illustrates the method of measuring the horizontal inclination by means of the instrument positioned in front of one headlight and the marker in front of the other.

Fig. 18 is a vertical section through the optical finder employed to determine the horizontal inclination of the beam.

Fig. 19 is a horizontal section therethrough taken as indicated by the arrows 19—19 in Fig. 18.

Fig. 20 is a plan view with parts broken away of the finder in a different position.

Fig. 21 is a horizontal section through the instrument, showing the means for adjusting the finder.

Fig. 22 is a wiring diagram.

Fig. 23 illustrates the manner of using the headlight testing apparatus when the instrument is mounted on a mobile stand.

Fig. 24 is a right side elevation of the instrument mounted on the stand.

Fig. 25 is a plan view thereof.

Fig. 26 is a fragmentary plan view of the instrument support provided in the stand.

Figure 8:
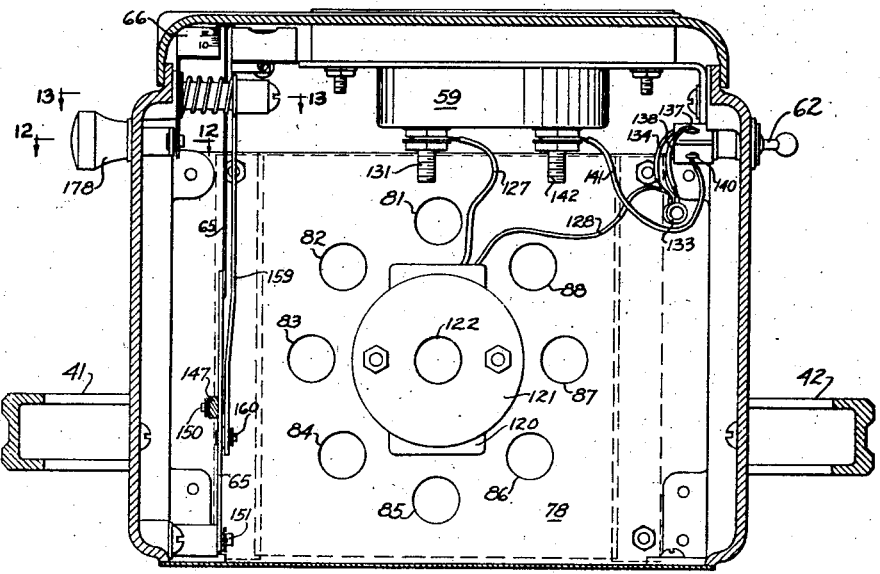
Fig. 8 is a vertical transverse section taken as indicated by the arrows 8—8 in Fig. 1.

In order to facilitate an understanding of the invention, a preliminary explanation will be given in which the general arrangement and use of the instrument will be briefly set forth.

The headlight testing instrument comprises certain mechanism presently to be described in detail, which is contained in a case 40 (Fig. 1). The case is provided with a handle 41 mounted on the left side 45 and a handle 42 mounted on the right side 46 thereof. When used as a portable instrument the operator holds the instrument in his hands by means of the handles 41, 42. The instrument is placed in the beam of the headlight to be tested by pressing the contact 43, which is preferably made of rubber, against the lens of the headlight.

Rays from the beam of the headlight are admitted to the interior of the instrument through a plurality of orifices numbered 51 to 58 (Fig. 4) located about the contact 43 in the front wall 44 of the case 40.

The intensity of the light admitted to the instrument from the beam is registered on the meter 59 (Fig. 1) which is provided with a pointer 60 that moves over a scale 61 calibrated in candle power. A switch 62 mounted on the right side 46 of the case 40 governs the range of the meter 59, as will presently be described.

Holding the contact 43 against the lens of the headlight the operator manipulates the instrument with a universal movement, that is, left and right, and up and down, until he finds the position of the instrument at which tehe maximum reading is obtained on the intensity meter 59. The longitudinal axis of the instrument which passes through the center of the contact 43 is then substantially in coincidence with the axis of the beam and in parallelism with the rays thereof. In order to determine the direction of the beam, he turns the knob 63 with his left thumb to measure the vertical inclination, and he turns the knob 64 with his right thumb to measure the horizontal inclination. When the knob 63 has been properly adjusted, as will presently be described, the operator reads the vertical inclination by means of the pointer 65 on the scale 66, and when the knob 64 has been properly adjusted, he reads the horizontal inclination by means of the pointer 67, which has two cross hairs 68 that cooperate with two sets of scales, one for the right hand lamp, the other for the left hand lamp. These scales are marked on an arcuate strip 69 which is attached by means of screws 70 to the top of the case 40. The upper scales 71 are calibrated in degrees, and the lower scales 72 are calibrated in inches at twenty-five feet distance, so that the horizontal inclination may be measured either in angular degrees or in distance.

Proceeding now with a detailed description of the instrument mechanism, the rubber contact 43 (Fig. 5) has a press fit in a metal cup 73 which is mounted on the front wall 44 of the case 40 by means of a spacer bracket 74 and a screw 75 which passes through the cup 73 and the bracket 74 and is threaded into the front wall 44 at 76. It will be recalled that there are a series of apertures 51 to 58 (Fig. 4) in the front wall 44. The top and bottom apertures 51 and 55 appear in Fig. 5. The longitudinal or reference axis of the instrument or tester is indicated by the center line 77.

Figure 9:
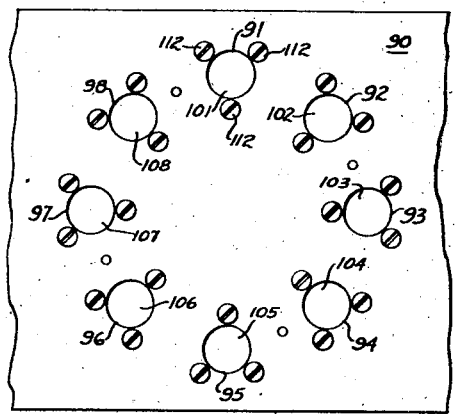
Fig. 9 is a fragmentary elevation taken as indicated by the arrows 9—9 in Fig. 5.

Rigidly mounted within the case 40 and accurately positioned normal to the reference axis 77 is the diaphragm 78. The diaphragm 78 (Fig. 8) has a series of apertures 81 to 88 which are located in longitudinal alignment with the apertures 51 to 58 (Fig. 4), and are smaller than the apertures 51 to 58. The top and bottom diaphragm apertures 81, 85 appear in Fig. 5. A transparent glass plate 89 is mounted on the front of the diaphragm 78 and covers the apertures therein. A second diaphragm 90 is rigidly mounted in the rear end of the case 40 so as to be accurately positioned normal to the longitudinal axis 77. The diaphragm 90 (Fig. 9) has a series of apertures 91 to 98 which are the same size as the apertures in the front diaphragm 78 and are located in longitudinal alignment therewith. The purpose of the aligned apertures in the two diaphragms 78 and 90 is to select parallel rays from the beam of the headlight.

When the instrument axis 77 is positioned substantially coincident with the axis of the beam and parallel to the rays thereof, parallel rays such as 99 and 100 (Fig. 5) will enter the apertures 51, 55 in the front wall 44 of the case, pass through the apertures 81 and 85 in the front diaphragm 78 and then pass through the apertures 91, 95 in the rear diaphragm 90. It will be apparent that this only occurs when the instrument is positioned so that its axis 77 is parallel to the rays 99, 100, because if the instrument axis 77 is out of parallelism with the rays of the beam, rays such as 99, 100, although they might enter the apertures 51, 55, would not pass through the apertures 91 and 95.

Figure 10:
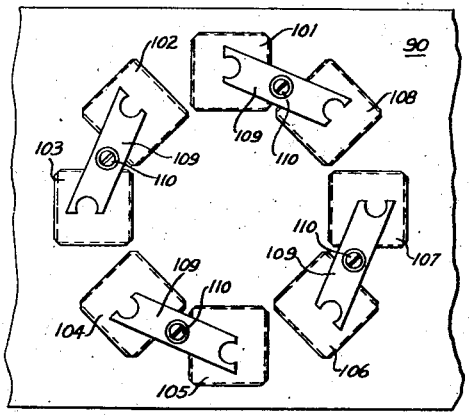
Fig. 10 is a fragmentary elevation taken as indicated by the arrows 10—10 in Fig. 5.

A series of planar mirrors 101 to 108 (Figs. 5, 9, and 10) is mounted on the rear side of the rear diaphragm 90 with the mirror 101 behind aperture 91, mirror 102 behind aperture 92, mirror 103 behind aperture 93, and so on. Bowed spring clamps 109 are fastened to the diaphragm 90 by means of screws 110. The ends of each clamp bear against the backs of two adjacent mirrors. In this manner the mirrors are clamped against adjusting screws 112 which are threaded into the diaphragm 90, there being three adjusting screws 112 for each mirror.

The screws 112 are adjusted to position the mirrors so that they will reflect the rays into a light-sensitive cell 120. For example, in Fig. 5 the mirrors 101, 105 are adjusted so that they reflect the rays 99 and 100 in the directions indicated by the lines 113, 114 which converge at 115. A shield 121 having an aperture 122 is placed over the window of the light-sensitive cell 120. The shield 121 serves to exclude from the light-sensitive cell all rays reflected thereon except rays such as 99 and 100 which enter the instrument parallel to its axis 77. It will be noted that the focal point 115 of the reflected rays lies on the instrument axis 77, so that rays from the beam, such as 99 and 100, are not reflected onto the light-sensitive cell 120 until the instrument axis 77 is brought into parallelism with the rays of the beam.

The light-sensitive cell 120 is rigidly mounted on the front diaphragm 78 by means of two bosses 123, 124 (Fig. 21) into which screws 125, 126 are threaded. The light-sensitive sell 120 (Fig. 5) is of the blocking-layer type, the metallic elements of which create an electromotive force when exposed to light. The electrical response of the cell is measured by a sensitive meter 59. Wires 127, 128 (Figs. 5 and 8) are connected to the terminals 129, 130 of the cell 120. The wire 127 leads to the terminal 131 of the meter 59, while the wire 128 is connected at 132 to a fixed resistance 133. A short wire 134 connects the end 132 of the resistance to the terminal 135 of the switch 62. Terminal 137 of the switch is connected by a wire 138 to the end 139 of the resistance 133. The terminal 140 of the switch is connected by a wire 141 to the terminal 142 of the meter 59. As shown by the wiring diagram in Fig. 22, the switch 62 serves to connect the resistance 133 in series with the meter 59 and the cell 120, or to cut the resistance 133 out of the circuit. The purpose of this arrangement is to give the meter 59 a high and low range depending on whether the resistance 133 is cut in or out of the circuit by the switch 62.

Thus, when the instrument axis 77 (Fig. 5) is brought into line with the beam, parallel rays pass through the apertures in the two diaphragms 78, 90 and are reflected by the mirrors through the aperture 122 into the light-sensitive cell 120, and the meter 59 (Fig. 1) registers the intensity of the light. Conversely, when a maximum reading is obtained on the meter 59, it is an indication that the instrument axis has been positioned in line with the beam and the direction of the beam is, in this way, determined.

The mechanism by which the vertical and horizontal angles of inclination of the beam to the line of travel of the vehicle are measured will now be described.

The vertical inclination is determined by means of a gravity-responsive leveling device which is adjusted by means of the knob 63 (Fig. 1) disposed within the handle 41. The knob 63 is secured by means of a set screw 143 to the outer end of a shaft 144 (Fig. 21) which is mounted for rotation in a boss 145 formed on the side wall 45 of the case. A pinion 146 is secured on the shaft 144 for rotation by the knob 63. A rack 147 (Fig. 11) meshes with the pinion 146. Guide plate 148 is rigidly attached to the rack 147 and has a slot 149 therein through which the shaft 144 passes so that the rack 147 is guided for sliding movement with respect to the shaft 144 and is maintained in mesh with the pinion 146. The forward end of the rack 147 is pivotally connected at 150 to the pointer 65. The foot of the pointer 65 is pivotally supported at 151 on the bar 152 which is provided with two slots 153, 154 to receive screws 155, 156 which are threaded into bosses 157, 158 (Fig. 21) formed on the side wall 45 of the case. By loosening the screws 155, 156 the bar 152 may be moved forwardly or rearwardly to position the pivotal center 151 of the pointer 65. This adjustment is usually made at the factory for a purpose presently to be described. A lever 159 (Figs. 8 and 11) is connected at 160 to the pointer 65. The lever 159 is rotatably mounted by means of a pin 161 (Figs. 11 and 13) secured thereto and having bearing in an aperture 162 in a member 163 which is rigidly mounted on the side wall 45 by means of screws 164, 165 which extend through spacing sleeves 166, 167. It will be understood that the member 163 is fixed but the pin 161 is free to rotate in the aperture 162, thus providing a fulcrum for the lever 159. The upper end of the lever 159 (Figs. 11 and 14) has a spirit level 168 rigidly secured thereto.

By means of the linkage construction just described, the rack 147 (Fig. 11) oscillates the pointer 65 and rocks the spirit level 168 on its fulcrum 161. The construction of the linkage is such that while the movement of the pointer is proportional to the movement of the spirit level, the movement of the pointer is greatly multiplied to facilitate obtaining a reading on the scale 66. Also, the movements are in opposite directions; that is, when the rack 147 moves the pointer 65 to the left in Fig. 11, the level 168 is rocked to the right. This further facilitates making the adjustment in that the pointer moves in the same direction as the bubble 169 of the level 168.

The scale 66 (Fig. 11) is arcuate in shape and is secured at its outer edge 170 (Fig. 14) to a vertical plate 171 having slots 172, 173 (Fig. 13) through which the spacing sleeves 166, 167 extend. Springs 174, 175 coiled about the sleeves 166, 167 bear against washers 176, 177 to apply friction to the plate 171 to hold the plate 171 in its adjusted position on the sleeves 166, 167. It will be understood that the plate 171 is supported by means of these sleeves but is slidably adjustable thereon by reason of the slots 172, 173. In order to impart this sliding adjustment to the scale plate 171 (Fig. 12) a knob 178 is provided outside the side wall 45. A screw 179 which is slidable in a slot 180 (Figs. 3 and 12) formed in the wall 45 is threaded into the knob 178. The screw 179 passes through a member 181 which has pins 182, 183 engaging in apertures 184, 185 in the scale plate 171. In order to adjust the scale 66 the operator unscrews the knob 178 from the screw 179 a sufficient amount to permit him to move the knob back and forth, thus causing the scale plate 171 to slide on the sleeves 166, 167. When the scale 66 has been positioned as desired, the knob 178 is tightened to hold the adjustment. This scale adjustment is employed by the operator to correct the zero position when the automobile is not standing on a true horizontal surface at the time the headlights are being tested.

The operator makes the corrective adjustment by placing the instrument on a part of the car which is known to be level, such as the running board or the floor of the trunk compartment, and levelling the spirit level 168 (Fig. 1) by turning the knob 63. When the bubble 169 is between the centering lines 186, 187, which are marked on the glass tube of the level, the pointer 65 is opposite the mark 65' at the center of the bubble if the surface on which the automobile is standing is horizontal. However, if the surface is inclined to the horizontal, the pointer 65 will not be opposite the mark 65' at the center of the bubble when the bubble is centered between the lines 186, 187. The operator is able to correct for this condition by loosening the knob 178 and shifting the scale 66 until the zero point is opposite the pointer 65. He then locks the scale in this corrected position by screwing in the knob 178.

After this preliminary adjustment the operator places the instrument in front of one of the headlights, holding it by the handles 41, 42, and presses the contact 43 against the center of the lens. Maintaining sufficient pressure on the rubber contact 43 to prevent the contact from slipping on the lens, he manipulates the instrument, employing the flexible contact 43 as a universal pivot, until he finds the position of the instrument at which a maximum reading is obtained on the meter scale 61. When the meter indicates that the instrument axis has thus been brought into line with the beam, the operator holds the instrument stationary and turns the knob 63 with his thumb, so as to return the bubble 169 to its central position between the centering lines 186, 187. After this has been done the position of the pointer 65 on the scale 66 is read, and this reading is an indication of the vertical inclination of the beam to the line of travel of the automobile.

As previously mentioned, the adjustment of the pointer 65 (Fig. 1) is facilitated by the fact that the pointer moves in the same direction as the bubble 169 so that, for example, when the instrument has been positioned to obtain the maximum reading on the meter 59, if the bubble 169 is rearward of the centering line 187, the operator turns the knob 63 to move the pointer 65 forwardly, and in so doing moves the bubble forwardly. As can be seen in Fig. 11, when the pointer 65 is rocked forwardly, that is, to the right in this view, the lever 159 is turned counterclockwise on its pivot 161, thus causing the bubble 169 to move to the right or forwardly in the same direction as the pointer 65. Due to this linkage construction, there is only one position of the levers 65 and 159 in which the pointer is opposite the bubble 169. This is the true horizontal position, that is, when the axis of the instrument is horizontal. The pointer is adjusted to this position at the factory by loosening the screws 155, 156 and sliding the bar 152 forwardly or rearwardly when the instrument is placed on a surface which is known to be horizontal.

The method and apparatus for measuring the horizontal inclination of the headlight beam will now be described. The method consists in establishing a plane represented by the dot-dash line 188 (Fig. 17) normal to the lines of travel of the vehicle, such as the lines represented at 189 and 192, and then measuring the angle 190 which the beam direction 191 makes with the established transverse plane 188. The line of travel 192 normal to the plane 188 and passing through the contact 43 forms with the instrument axis 77, which coincides with the beam direction 191, an angle 193 which is the complement of the angle 190. The angle 193 is the horizontal inclination of the beam to the line of travel of the vehicle. In other words, to determine the horizontal inclination of the beam to the line of travel, the following steps are taken: the imaginary plane normal to the line of travel is established. The horizontal angle which the beam makes with the imaginary plane is determined. Finally, the complement of the angle between the beam and the plane is measured, because this complementary angle equals the horizontal angle between the beam and the line of travel.

The apparatus for establishing the imaginary reference plane 188 is constructed as follows. As shown in Fig. 17, when testing one headlight with the instrument, a marker device indicated generally at 194 is placed in front of the other headlight. The device 194 (Fig. 16) includes a pendulum rod 195 which is suspended in a vertical position at a predetermined fixed distance K in front of the lens 196 of the headlight. Preferably the rod 195 is chromium plated so that it will be illuminated by the beam from the headlight. Referring to Fig. 15, where the marker device 194 is shown in perspective on an enlarged scale, the pendulum rod 195 is pivotally mounted at 197 in a support 198 having a bearing portion 199 bored to receive a rod 200. The portion 199 is rigidly secured at 201 to a tube 202 which is rigidly secured at 203 to a bearing 204 formed integrally with a bar 205 having guide lugs 206 for a member 207 which can be adjusted vertically by sliding on the bar 205. The member has two guide lugs 208 which embrace the bar 205. The foot of the member 207 extends forwardly toward the headlight and is provided with a contact 209 which is brought into engagement with the lens 196 as shown in Fig. 16. The rod 200 which is slidable in the bearings 199, 204, has an eye 210 formed at its forward end. The eye portion 210 fits into a circular groove 211 formed in the periphery of a disc 212 so that the disc 212 is freely rotatable within the eye member 210 about a horizontal axis. The disc 212 has a bore 213 coincident with its axis of rotation, and the bent rod 214 having downwardly inclined ends 215, 216 is supported for rotation in the bore 213. Rubber suction cups 217, 218 are pivotally mounted at 219, 220 on the ends of the bent rod 214.

These suction cups are pressed into engagement with the headlight as shown in Fig. 16 or into engagement with the fender as shown in Fig. 23, depending on the manner in which the headlight is mounted. The tube 202 (Fig. 16), together with the bearings 199, 204, is slid along the rod 200 to bring the contact 209 against the lens 196. The member 207 is vertically adjusted on its supporting bar 205 to bring the contact 209 to the center of the lens. The tube 202 is then adjusted on the rod 200 until the pendulum 195 is at a vertical position, as indicated by the top end 221 of the rod being opposite the pointer 222. By this means the rod 195 is positioned vertically in front of the opposite headlight and at a predetermined fixed distance in front of the lens thereof. It will be noted that the horizontal distance K from the contact 209 (Fig. 16) to the rod 195 remains constant on account of the fact that the members 198 and 205 are rigidly joined together by means of the tube 202, which is welded to the bearings 199 and 204, so that the assembly 198 to 205 is a unit. The vertical axis 223 (Fig. 5) of an optical finder 224 in the instrument is located this same distance K from the contact 43, so that the imaginary reference plane is established by sighting the marker 195 through the finder 224 because they are disposed at equal distances in front of the two headlights.

The finder 224 comprises a laterally extending tube 225 (Fig. 18) having a lens 226 in the outer end thereof. The tube 225 is formed integrally with the mounting 226' which has a vertically extending cylindrical portion 227 rotatable in a bore 229 in a boss 230 formed in the top of the case 40. A collar 231 is secured to the cylindrical portion 227 by means of a set screw 232. The hub 233 of the pointer 67 (Fig. 1) is interposed between the bottom of the collar 231 and the top of the boss 230. The pointer 67 (Fig. 5) has a spring detent 234 attached thereto which engages in the notch 235 (Figs. 5 and 19) formed in the underside of the collar 231. This connection between the hub of the pointer and the collar of the finder is made detachable for a purpose presently to be described. As long as the detent 234 is seated in the notch 235 the pointer 67 and the collar 231 rotate in unison about the axis 223 of the finder. An adjustable eye piece 236 having a ground glass screen 237 mounted in the lower end thereof is slidably mounted within the cylindrical portion 227. And a mirror 238 is clamped by means of screws 239 to the mounting 226'. There is a window 240 in the side wall 46 of the case. By moving the eye piece up and down the operator can focus the image of the pendulum rod 195 which is reflected from the mirror 238 on the ground glass 237.

In order to test both headlights, the finder 224 is adjustable to right and left hand positions, which are 180° apart. The position shown in Figs. 18 and 19 is the position of the parts when the left hand headlight is being tested, in which case the tube 225 points to the right and the image of the rod is received through the right hand window 240. When the right hand headlight is being tested, as shown in Fig. 17, the tube 225 is swung around to point out of the left hand window 241, as shown in Fig. 20. This is made possible by the following construction. The collar 231 (Fig. 19) has a semi-circular depression 242 formed therein into which extends a pin 243 having a press fit in an aperture 244 (Fig. 18) in the boss 230. The pin 243 serves as a stop pin. The semi-circular depression 242 permits the collar 231 to be rotated through 180° clockwise in Fig. 19 but prevents counterclockwise rotation for more than a limited amount. Diametrically opposite the notch 235 in the collar 231 is a similar notch 245 in which the detent 234 is adapted to seat after the collar 231 has been rotated 180°. The detent and the pointer 67 are limited in their movement by reason of the fact that the hub 233 of the pointer 67 has an opening 246 through which the pin 243 extends, and the limits of movement of the pointer 67 are determined by contact of either of the two edges 247 with the pin 243. To change the finder from the right hand position (Fig. 19) to the left hand position (Fig. 20) the operator turns the collar 231 clockwise. When the wall 247 of the opening 246 in the hub 233 contacts the pin 243, the pointer 67 is stopped and the detent 234 is disengaged from the notch 235. The operator continues to turn the collar 231 for 180° until the notch 245 receives the detent 234, thus again coupling the pointer to the finder for use in the left hand position (Fig. 20). The pointer has two cross hairs 68 for cooperation with the right and left hand scales (Fig. 1) as previously described.

The means for adjusting the pointer 67 by means of the knob 64 will now be described. The knob 64 (Fig. 21) is secured by means of a set screw 247 to a shaft 248 rotatably supported in a boss 249 formed on the side wall 46. The shaft 248 has a pinion 250 (Fig. 6) secured thereto which meshes with a rack 251 (Fig. 5). A plate 252 is secured to the rack 251 and has a slot 253 formed therein to receive the shaft 248 whereby the rack 251 is maintained in engagement with the pinion 250. The forward end of the rack 251 is pivotally connected at 254 to a lever 255 which is pivotally mounted on the side wall 46 by means of a pin 256. The upper end of the lever 255 has a pin 257 rigidly mounted therein and extending inwardly for engagement in a jaw 258 formed in the end of a bell crank 259 (Fig. 21). The bell crank 259 is pivotally supported at 260 from the top of the case 40. The other arm of the bell crank 259 has a pin 261 rigidly secured thereto which projects upwardly through a slot 262 (Figs. 5 and 7) formed in the top of the case 40 into a slot 263 formed in the pointer 67. When the knob 64 (Fig. 21) is rotated by the operator, it turns the pinion 250 and through the rack 251 (Fig. 5) oscillates the lever 255 which in turn oscillates the bell crank 259 which by means of the pin 261 moves the pointer 67 over the scale 69, and since the pointer 67 is connected to the finder 224 by means of the detent 234 engaged in the notch 235 or the notch 245 rotation of the knob 64 also results in rotation of the finder 224.

The operation is as follows: To test the right hand headlight the marker device 194 (Fig. 17) is attached to the left hand headlight and adjusted to bring the contact 209 (Fig. 16) against the center of the lens 196 and to position the pendulum 195 in the vertical position with its end 221 opposite the pointer 222. The headlight testing instrument is then placed in front of the right hand headlight, as shown in Fig. 17, with its contact 43 against the lens, and the instrument is manipulated, as previously described, to obtain the maximum reading on the intensity meter, in order to bring the instrument axis into line with the beam.

Holding the instrument in this position, the operator rotates the knob 64 (Fig. 1) viewing the image of the pendulum on the other headlight through the eye piece 236. He turns the knob 64 to bring the image of the pendulum into coincidence with the cross hair 264 on the ground glass 237. When this has been done he notes the reading on the scale 69 for the right hand lamp. After the right hand headlight has been adjusted, he places the marker 194 on the right hand lamp, and turns the collar 231 (Fig. 20) 180°. The detent 234 disengages from the notch 245 and engages in the notch 235 (Fig. 19). The tube 225, which was directed at the left hand window 241, is thus swung around through 180° to be directed at the right hand window 240. The operator now places the instrument in front of the left hand headlight, engaging the contact 43 with the lens and manipulating the instrument as before to obtain the maximum intensity reading. He then turns the knob 64 (Fig. 1) to center the pendulum image on the cross hair 264 and reads the scale for the left hand lamp.

In Fig. 21 the finder 224 and pointer 67 are shown in phantom. Assuming that the instrument has been placed in front of the right hand headlight and has been manipulated until parallel rays 265 and 266 from the beam pass through apertures 83 and 87 in front diaphragm 78 and through apertures 93 and 97 in rear diaphragm 90 and are reflected by mirrors 103, 107 in the directions 267, 268 onto the light-sensitive cell 120, when the maximum meter reading is obtained it will indicate that the instrument axis 77 is in line with the beam. Now, if the knob 64 is adjusted to point the tube 225 of the finder 224 directly at the pendulum hanging on the other headlight, the angle 193 formed by the center line 269 of the pointer 67 with the axis 77 is the horizontal angle which the beam makes with the line of travel of the vehicle, and this horizontal inclination is measured by the position of the pointer 67 (Fig. 1) on the scale 69.

Instead of employing the headlight tester as a portable instrument, it can be used with a mobile stand, if so desired. The method of using the instrument and its construction and mode of operation, however, remain unchanged. As shown in Figs. 23 to 25, the stand is provided with a base 270 supported on three wheels 271, 272, 273. A vertical tubular support 274 is rigidly mounted on the base 270. A second tube 275 is telescopically mounted on the tube 274 and is adapted to be vertically adjusted thereon and held in adjusted position by means of a clamp 276. The instrument support 277 has a bearing portion 278 vertically slidable on the tube 275. The weight of the instrument and its support 277 is carried on a pulley 279 rotatably mounted in the top of the tube 275 by means of a cable 280 and counterweight 281.

The base of the instrument has two apertures therein to receive dowel pins 282, 283. The dowel pins 282, 283 (Fig. 26) are fixed in a lever 284 which is mounted for swinging movement on a pivot coincident with the front dowel 283 on a member 285. The rear end of the lever 284 extends through an arcuate slot 286 formed in the member 285. The member 285 has a horizontal pivot 287 (Figs. 24 and 26) in the front end of the support 277. A pin 288 is fixed in the bottom of the member 285 and extends downwardly as shown in Fig. 24, to engage the front end of a lever 289 pivoted in the support 277 at 290. An adjusting screw 291 adjustably mounted on the support 277 bears against the rear end of the lever 289. By turning the screw 291 the instrument can be adjusted about the horizontal pivot 287 and by swinging the lever 284 the instrument can be adjusted about the vertical pivot 283.

This mechanical supporting and adjusting means is employed in the same manner as previously described to adjust the instrument in the beam of the headlight to obtain the maximum reading on the meter 59, the contact 43 being engaged with the lens 292 (Fig. 23) of the headlight. The vertical inclination is indicated on the scale 66 after adjusting the knob 63 and the horizontal inclination is read on the scale 69 after adjusting the knob 64, the marker 194 being attached to the other headlight in the manner previously explained.

While I have described a particular embodiment of the present invention, it will be obvious that various changes and modifications may be made in the details thereof without departing from the spirit of the present invention and the scope of the appended claims.

Having thus described my invention and in what manner the same may be used, what I claim as new and desire to protect by Letters Patent is:

1. A headlight testing instrument adapted to be placed in the beam of a headlight, comprising a front diaphragm disposed normal to the axis of the instrument and having a plurality of apertures arranged around said axis, a rear diaphragm spaced apart from said front diaphragm and disposed normal to said axis, said rear diaphragm having apertures corresponding to said apertures in said front diaphragm and arranged in longitudinal alignment therewith so that rays from the beam entering an aperture in said front diaphragm parallel to said axis will pass through the corresponding aperture in said second diaphragm, a light-sensitive cell disposed on said axis intermediate said diaphragms, a plurality of planar mirrors mounted on said second diaphragm behind the apertures therein and arranged to receive the rays passing through said apertures and to reflect the rays which pass through said apertures in said second diaphragm onto said cell, and a meter to register the response of said cell to the light reflected thereon.

2. A headlight testing instrument adapted to be placed in the beam of a headlight, comprising a front diaphragm disposed normal to the axis of the instrument and having a plurality of apertures arranged around said axis, a rear diaphragm spaced apart from said front diaphragm and disposed normal to said axis, said rear diaphragm having apertures corresponding to said apertures in said front diaphragm and arranged in longitudinal alignment therewith so that rays from the beam entering an aperture in said front diaphragm parallel to said axis will pass through the corresponding aperture in said second diaphragm, a light-sensitive cell mounted on said front diaphragm and having a light shield disposed normal to said axis, said shield having an aperture to admit light to said cell, the center of said aperture being on said axis, a planar mirror mounted on said second diaphragm behind each aperture therein and angularly inclined to receive the ray which passes through the aperture and to reflect said ray through said shield aperture into said cell, and a meter to register the response of said cell to the light reflected through said shield by said mirrors.

3. A headlight testing instrument having a contact adapted to be placed in engagement with the lens of the headlight, said instrument having diaphragm means disposed normal to the axis of said instrument and provided with a plurality of apertures for admitting a plurality of parallel rays of light from the headlight beam, and means responsive to the light intensity of said rays for indicating when the axis of the instrument is parallel with said headlight beam, said contact being mounted on the light-admitting end of the instrument in front of said diaphragm means and located on the axis of the instrument, whereby the instrument can be manipulated universally on said contact as a pivot.

4. A headlight testing instrument adapted to be placed in the beam of the headlight comprising, a case, a single contact mounted on the front of said case and adapted to be brought into engagement with the lens of the headlight, means for selecting parallel rays from the beam, said means comprising spaced-apart diaphragms mounted within said case normal to the longitudinal axis of the instrument and provided with longitudinally-aligned apertures, a light-sensitive cell having a light-admitting aperture disposed on said axis, means to direct said selected parallel rays through said cell aperture, and a meter to register the response of said cell to the light directed thereon, said longitudinal axis of said instrument passing through the center of said lens contact, whereby the instrument can be manipulated universally on said contact as a pivot to position the instrument axis parallel to the rays of the beam as indicated by a maximum light-intensity reading on said meter.

5. A device for testing the headlight of an automobile comprising a portable housing, a light receiving opening in one end of said housing adapted to receive a light beam from said headlight, means in said housing and visible from the exterior thereof for receiving the light beam entering said opening and indicating when the axis of said beam coincides with the axis of the housing, a second opening in a side wall of said housing adapted to receive a second light beam from an external source, and means in said housing and visible from the exterior thereof for receiving said second beam and indicating when the axis of said second beam has a predetermined angular relationship to the axis of said housing.

6. A headlight tester adapted to be placed in the light beam of a headlight comprising means for indicating when the axis of the light beam of the headlight is parallel to a predetermined reference axis of the tester, an optical system associated with the tester, means for positioning the optical system at a predetermined distance ahead of the headlight, and means associated with the optical system for indicating the angular relationship of the reference axis with respect to a ray of light received by said optical system from a source laterally disposed of said tester and positioned a definite distance ahead of said headlight.

7. An automobile headlight testing instrument adapted to be placed in front of a headlight beam comprising a contact for contacting the headlight to dispose the instrument a predetermined distance from the same, means for aligning the longitudinal axis of the instrument with the direction of the beam projected by the headlight with which the instrument is in contact, an optical finder mounted on said instrument for angular adjustment on a vertical axis intersecting the longitudinal axis of the instrument at a point spaced a predetermined distance from said headlight, and means for indicating the angular disposition of said finder relative to the longitudinal axis of the instrument when said finder is sighted on a marker positioned a distance in front of the other headlight equal to the distance of the intersection of said axes from said first mentioned headlight.

8. An automobile headlight testing instrument comprising a contact on the longitudinal axis thereof for engagement with a headlight, means for indicating when the instrument axis is in line with the beam of the headlight, an optical finder angularly adjustable on a vertical axis intersecting said instrument axis, means for indicating the angular adjustment of said finder with respect to the instrument axis, and means for aligning said finder with a marker positioned in front of the other headlight a distance equal to the distance of the intersection of said axes from said first mentioned headlight.

9. An automobile headlight testing apparatus adapted to be placed in front of one headlight, comprising a housing, a light sensitive cell on the longitudinal axis of said housing, spaced apart diaphragms associated with the housing and disposed normal to the longitudinal axis thereof, said diaphragms having longitudinally aligned apertures for separating parallel rays from the beam of the headlight, light collecting and directing means arranged to receive said parallel rays and to direct and focus the same onto said cell, a meter for registering the electrical response of said cell, an optical finder mounted within said housing for angular adjustment about a vertical axis intersecting the longitudinal axis of the housing at right angles, the side wall of said housing having an aperture aligned with said finder, and an indicator for indicating the angular adjustment of said finder with respect to the longitudinal axis of the housing whereby said housing can be positioned with the longitudinal axis thereof in line with the headlight beam as indicated by the maximum reading on said meter and said finder can be adjusted to sight a marker placed in front of the other headlight to obtain a measurement of the lateral aim of said beam.

10. An automobile headlight testing instrument comprising, a case having a contact for engaging the lens of one headlight, handles on said case for enabling an operator to manipulate the case on said contact as a pivot to align the axis of the case with the beam of said headlight, an optical finder in said case adjustable for sighting a marker disposed in front of the other headlight, means to adjust said finder including an adjusting member adjacent one of said handles, a scale on said case disposed at one side of the axis of the case, and an indicator adjustable with said finder and cooperating with said scale for registering the horizontal inclination of the beam of said first mentioned headlight relative to the inclination of the beam of the other headlight, said indicator being so connected to said finder that the indicator is at zero on said scale when the sight line of said finder is at right angles to the case axis.

11. An apparatus for determining the direction of a headlight beam comprising a pair of diaphragms for positioning in front of a headlight, said diaphragms being arranged one behind the other and provided with aligned apertures whereby to separate parallel shafts of light from said beam and permit passage of said shafts therethrough, light intensity indicating means, and planar mirrors arranged to receive said parallel shafts of light and to reflect and superimpose them onto said intensity indicating means, said diaphragms shielding said mirrors and indicating means from the remaining rays of the headlight beam.

12. An apparatus for determining the direction of a headlight beam comprising a pair of diaphragms for positioning in front of a headlight, said diaphragms being arranged one behind the other and provided with aligned apertures whereby to separate parallel shafts of light from said beam and permit passage of said shafts therethrough, light intensity indicating means intermediate said diaphragms, planar mirrors arranged to receive said parallel shafts of light, and adjustable means for individually positioning said planar mirrors relative to the apertures of the diaphragms and the light intensity indicating means to reflect the shafts of light admitted by the apertures of the diaphragms onto said light intensity indicating means.

13. A device for testing the lateral adjustment of an automobile headlight, which includes a housing having an opening adapted to be manually positioned in opposition to the lens of a headlight, said housing being provided with externally-observable means for indicating when it is also positioned in a definite relation to the "hot spot" of the beam projected through said opening by said headlight, an externally-observable screen in said housing, a second opening in said housing, an optical system in said housing aligned with said second opening and so positioned that when said housing is positioned in said relation to said headlight lens and said "hot spot," a beam of light originating at a point to one side of and at a definite distance ahead of said headlight lens will pass through said optical system and impinge upon an indicated part of said screen when the headlight beam is projected in the desired direction laterally with respect to the longitudinal axis of the automobile.

14. A device for testing the lateral adjustment of an automobile headlight, which includes a housing having an opening adapted to be manually positioned in opposition to the lens of a headlight, said housing being provided with externally-observable means for indicating when it is also positioned in a definite relation to the "hot spot" of the beam projected through said opening by said headlight, an externally-observable screen in said housing, a second opening in said housing, an optical system in said housing aligned with said second opening and so positioned that, when said housing is positioned in said relation to said headlight and said "hot spot," a beam of light originating at a point to one side of and at a definite distance ahead of said headlight lens will pass through said optical system and impinge upon an indicated part of said screen when the headlight beam is projected in the desired direction laterally with respect to the longitudinal axis of the automobile, both said means and said screen being so positioned as to be observable from the same position of observation.

15. A device for testing the adjustment of an automobile headlight, which includes a housing having an opening adapted to be manually positioned in opposition to the lens of a headlight, externally-observable means for indicating when the housing is also positioned in a definite relation to the "hot spot" of the headlight beam projected through said opening, an externally-observable target, a second opening in said housing, an optical system in said housing, the optical axis of which passes through said second opening and is also so directed as to direct a beam of light from a source positioned to one side of and at a predetermined distance in front of the headlight lens onto an indicated part of said target when the headlight beam is projected in the desired direction laterally with respect to the longitudinal axis of the automobile.

16. A device for testing the headlight of an automobile comprising a portable housing, a light receiving opening in one end of said housing adapted to receive a light beam from said headlight, means adapted to be manually positioned against the lens of said headlight to position said opening in opposition to said lens, means in said housing and visible from the exterior thereof for receiving the light beam entering said opening and indicating when the axis of said beam coincides with the axis of the housing, a second opening in a side wall of said housing adapted to receive a second light beam from an external source, and means in said housing and visible from the exterior thereof for receiving said second beam and indicating when the axis of said second beam has a predetermined angular relationship to the axis of said housing.

17. A device for testing the headlight of an automobile comprising a portable housing, a light receiving opening in one end of said housing adapted to receive a light beam from said headlight, means in said housing and visible from the exterior thereof for receiving the light beam entering said opening and indicating when the axis of said beam coincides with the axis of the housing, said means comprising an electrical light responsive element, a second opening in a side wall of said housing adapted to receive a second light beam from an external source, and means including a screen in said housing and visible from the exterior thereof for receiving said second beam and indicating when the axis of said second beam has a predetermined angular relationship to the axis of said housing.

18. A device for testing the headlight of an automobile comprising a portable housing, a light receiving opening in one end of said housing adapted to receive a light beam from said headlight, means adapted to be manually positioned against the lens of said headlight to position said opening in opposition to said lens, means in said housing and visible from the exterior thereof for receiving the light beam entering said opening and indicating when the axis of said beam coincides with the axis of the housing, said means comprising an electrical light responsive element, a second opening in a side wall of said housing adapted to receive a second light beam from an external source, and means in said housing and visible from the exterior thereof for receiving said second beam and indicating when the axis of said second beam has a predetermined angular relationship to the axis of said housing, said means including a reflector for receiving light from said second opening and adapted to reflect said light on an externally observable screen.

19. An automobile headlight testing apparatus for determining the direction in which a headlight is projecting its beam, comprising a support adapted to be positioned in front of one headlight with the longitudinal axis of the support aligned with the headlight beam, an optical finder mounted on said support, said optical finder being adjustable for sighting on a marker in front of the other headlight of the automobile, an indicator releasably connected to said finder for registering the angular position of said optical finder with respect to the longitudinal axis of said support, and means operatively interconnecting said indicator and said optical finder in two positions of said finder, one for sighting to the left, the other to the right, said interconnecting means being operable to disconnect the indicator from the finder when the finder is moved from one position to the other.

20. An apparatus for determining the lateral adjustment of an automobile headlight comprising a support adapted to be placed in front of one headlight with the longitudinal axis of the support aligned with the headlight beam, an optical finder mounted on the support for rotation on a vertical axis through an angle of approximately 180° to dispose said finder in diametrically opposite positions on the support, a pointer releasably connected to said finder and movable over a scale mounted on the support to indicate the angular position of said finder with respect to the longitudinal axis of said support, means for connecting said pointer and said finder for movement together when said finder is disposed in either one of said diametrically opposite positions, and means for moving said pointer to adjust said finder for sighting the finder on a marker placed in front of the other headlight of the automobile, said connecting means being operable to disconnect the pointer from the finder when the finder is moved from one position to the other.

21. An apparatus for testing the vertical and lateral adjustment of an automobile headlight comprising a support adapted to be positioned in front of one headlight of the automobile with the longitudinal axis of the support aligned with the headlight beam, spaced diaphragms on said support having longitudinally aligned apertures for admitting rays from the beam parallel to the axis of the support, means on said support responsive to the rays of the headlight beam passing through the aligned apertures of said diaphragms for indicating the amount of light passing through said apertures, means including a leveling device on said support for indicating the vertical inclination of the longitudinal axis of said support, means for measuring the lateral deviation of the longitudinal axis of said support with respect to the line of travel of the automobile when the longitudinal axis of the support is aligned with the headlight beam including an optical finder on the support, means for adjusting said finder for sighting a marker positioned in front of the other headlight of the automobile, and means for indicating the angular position of said finder with respect to the direction of the axis of the support when said finder is sighted against said marker.

22. An apparatus for testing the vertical and horizontal adjustment of an automobile headlight comprising a housing having a contact thereon aligned with the longitudinal axis of the housing, two handles on said housing for enabling an operator to hold the housing with said contact in engagement with the lens of the headlight and to manipulate the housing with said contact as a pivot to position the longitudinal axis of the housing in parallelism with the headlight beam, means associated with said housing for indicating when the longitudinal axis thereof is parallel with the headlight beam, means including a leveling device within said housing for measuring the vertical inclination of the longitudinal axis of said housing when the longitudinal axis of the housing is parallel with the headlight beam, means for measuring the horizontal deviation of the longitudinal axis of said housing with respect to the line of travel of the automobile when the longitudinal axis of the housing is aligned with the headlight beam including an optical finder within said housing, means for adjusting said finder from the exterior of said housing for sighting a marker positioned in front of the other headlight of the automobile, and means for indicating the angular position of said finder with respect to the longitudinal axis of said housing when said finder is sighted against said marker.

23. An apparatus for determining the direction in which a headlight of an automobile is projecting its beam comprising a support adapted to be placed in front of the headlight with the longitudinal axis of the support aligned with the headlight beam, an optical finder mounted on the support for rotation on a vertical axis intersecting the longitudinal axis of said support through an angle of approximately 180° to dispose said finder in diametrically opposite positions on the support, a pointer releasably connected to said finder and movable over a scale mounted on the support at one side of the longitudinal axis of the support to indicate the angular position of said finder with respect to the longitudinal axis of said support, means for connecting said pointer and said finder for movement together when said finder is disposed in either one of said diametrically opposite positions, and means for moving said pointer to adjust said finder for sighting the finder on a marker disposed in front of the other headlight of the automobile.

24. An apparatus for testing the vertical and the horizontal adjustment of an automobile headlight comprising, a housing having a contact thereon aligned with the longitudinal axis of the housing, two handles on said housing for enabling an operator to hold the housing with said contact in engagement with the lens of the headlight and to manipulate the housing with said contact as a pivot to position the longitudinal axis of the housing in parallelism with the headlight beam, means associated with said housing for indicating when the longitudinal axis thereof is parallel with the headlight beam, means including an adjustable leveling device within said housing for measuring the vertical inclination of the longitudinal axis of said housing when the longitudinal axis of the housing is parallel with the headlight beam, means exterior of said housing and adjacent one of said handles for adjusting said leveling device to horizontal position, a window formed in each side of said housing, means for measuring the horizontal deviation of the longitudinal axis of said housing with respect to the line of travel of the automobile when the longitudinal axis of the housing is aligned with the headlight beam, including an optical finder within said housing adapted to be placed for sighting through either of said windows, means adjacent the other of said handles for adjusting said finder from the exterior of said housing for sighting through either of said windows a marker positioned in front of the other headlight of the automobile, and means for indicating the angular position of said finder with respect to the longitudinal axis of said housing when the finder is sighted against said marker.

25. A headlight testing instrument adapted to be placed in the beam of the headlight and having a case containing testing mechanism responsive to changes in the light intensity as determined by changes in the position of said case relative to the headlight beam for indicating when the axis of said beam coincides with the axis of the instrument, the case being provided with a plurality of apertures to admit parallel shafts of light from the beam to the interior of said case, means within the case for intercepting parallel shafts of light admitted through the apertures for actuating the testing mechanism, and a contact composed of slip resisting material mounted in fixed position on said case centrally with respect to the apertures and coincident with the longitudinal axis of the instrument, said contact being adapted to engage the headlight at a single point and to permit the instrument to be manipulated universally on said contact as a pivot while said contact is maintained in engagement with the lens to position the instrument axis parallel to the shafts of light admitted through the apertures.

26. An automobile headlight testing apparatus comprising, a housing adapted to be placed in front of one headlight with the longitudinal axis of said housing aligned therewith, said housing being provided with a window on each side, an optical finder selectively rotatable into alignment with either of said windows for sighting a marker placed in front of the other headlight through the selected window, a pointer connected to said finder, means for releasing said connection to permit said selective rotation of the finder relative to the pointer, means for operatively connecting said pointer to said finder when said finder is positioned for sighting through either of said windows, and two scales at one end of said housing, one of said scales being disposed at one side of the longitudinal axis of said housing and cooperating with an index line on said pointer for measuring the horizontal aim of the left headlight of an automobile, and the other scale being disposed at the other side of the longitudinal axis of said housing and cooperating with a second index line on said pointer for measuring the horizontal aim of the right headlight of an automobile, the connection between said finder and said pointer being such that each of said index lines is at zero on its scale when the sight line of the finder is normal to said housing axis.

27. A headlight testing instrument adapted to be placed in the beam of a headlight and having a case containing testing mechanism capable of indicating changes in intensity of light impressed thereon as determined by changes in the position of said case relative to the headlight beam to indicate when the axis of said beam coincides with the axis of the case, said case being provided with a plurality of apertures for admitting shafts of light from the beam to the interior of said case, means within the case for intercepting the shafts of light admitted through the apertures and impressing the shafts of light on the testing mechanism, a contact mounted on the front of said case coincident with the longitudinal axis of the case and adapted to engage the lens of the headlight and to be maintained in engagement therewith while the case is manipulated universally with said contact as a pivot to position the case axis parallel to the axis of the headlight beam as indicated by a maximum light intensity indicated by said testing mechanism.

28. A headlight tester adapted to be placed in the light beam of one headlight of an automobile, comprising means for indicating when the axis of the light beam of the headlight is parallel to a predetermined reference axis of the tester, an adjustable lateral sighting device associated with said tester, means for positioning said device a predetermined distance ahead of the headlight, and means associated with said sighting device for indicating when the device is aligned with a marker positioned a predetermined distance in front of the other headlight of the automobile, whereby an imaginary plane is established between said indicating means and said marker to which plane the direction of the beam of the headlight to be tested can be referred to for measurement of its aim.

29. A headlight tester adapted to be placed in the light beam of one headlight of an automobile, comprising means for indicating when the axis of the light beam of the headlight is parallel to a predetermined reference axis of the tester, an adjustable lateral sighting device associated with said tester, means for positioning said device a predetermined distance ahead of the headlight, means associated with said sighting device for indicating when the device is aligned with a marker positioned a predetermined distance in front of the other headlight of the automobile, whereby an imaginary plane is established between said indicating means and said marker to which plane the direction of the beam of the headlight to be tested can be referred to for measurement of its aim, and means associated with the tester and the sighting device for measuring the angular disposition of the reference axis of the tester with respect to said imaginary plane.

30. A headlight tester adapted to be placed in the light beam of one headlight of an automobile, comprising means for indicating when the axis of the light beam of the headlight is aligned with a predetermined reference axis of the tester, a sighting device associated with said tester and angularly adjustable on a vertical axis intersecting said tester axis at a predetermined distance from the front of the tester, means for indicating when said sighting device is aligned with a target positioned in front of the other headlight of the automobile a distance substantially equal to the distance of the intersection of said vertical axis and said tester axis from the first mentioned headlight, and means for indicating the angular relationship of said sighting device with respect to the predetermined reference axis of the tester.

31. A headlight tester adapted to be placed in the light beam of a headlight, comprising means for indicating when the axis of the light beam of the headlight has a predetermined relationship to a predetermined reference axis of the tester, an optical system associated with the tester, means for positioning the optical system at a predetermined distance ahead of the headlight, and means associated with the optical system for indicating the angular relationship of the reference axis with respect to a ray of light received by said optical system from a source laterally disposed of said tester and positioned a definite distance ahead of said headlight.

HERBERT GLENN HOLMES.